(12) United States Patent
Murakami et al.

(10) Patent No.: US 10,277,819 B2
(45) Date of Patent: Apr. 30, 2019

(54) METHOD FOR CALIBRATING DRIVING AMOUNT OF ACTUATOR CONFIGURED TO CORRECT BLURRING OF IMAGE TAKEN BY CAMERA

(71) Applicant: Renesas Electronics Corporation, Tokyo (JP)

(72) Inventors: Hiroshi Murakami, Tokyo (JP); Mitsumasa Murakami, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/832,534

(22) Filed: Dec. 5, 2017

(65) Prior Publication Data

US 2018/0184004 A1    Jun. 28, 2018

(30) Foreign Application Priority Data

Dec. 27, 2016    (JP) .................. 2016-253390

(51) Int. Cl.

| | |
|---|---|
| *G01C 25/00* | (2006.01) |
| *G02B 13/00* | (2006.01) |
| *G02B 23/24* | (2006.01) |
| *G02B 27/64* | (2006.01) |
| *H04N 17/00* | (2006.01) |
| *H04N 5/225* | (2006.01) |
| *H04N 5/232* | (2006.01) |

(52) U.S. Cl.
CPC ....... *H04N 5/23267* (2013.01); *G01C 25/005* (2013.01); *G02B 23/24* (2013.01); *G02B 27/646* (2013.01); *H04N 5/2257* (2013.01); *H04N 5/23212* (2013.01); *H04N 5/23258* (2013.01); *H04N 5/23287* (2013.01); *H04N 17/002* (2013.01); *G02B 13/001* (2013.01)

(58) Field of Classification Search
CPC ............... G02B 23/24; H04N 5/23212; H04N 5/23267; H04N 5/23287
See application file for complete search history.

(56) References Cited

U.S. PATENT DOCUMENTS

| | | | | |
|---|---|---|---|---|
| 9,626,589 | B1 * | 4/2017 | Graham | ................. G06T 3/4038 |
| 2008/0124064 | A1 * | 5/2008 | Klinghult | ............... G03B 17/20 |
| | | | | 396/50 |
| 2010/0149359 | A1 * | 6/2010 | Taoka | .................... H04N 5/232 |
| | | | | 348/222.1 |
| 2012/0033107 | A1 * | 2/2012 | Ono | ..................... H04N 5/3572 |
| | | | | 348/241 |
| 2016/0255273 | A1 * | 9/2016 | Wakamatsu | ....... H04N 5/23248 |
| | | | | 348/208.99 |

FOREIGN PATENT DOCUMENTS

JP        2016-173517 A        9/2016

* cited by examiner

*Primary Examiner* — Amy R Hsu

(74) *Attorney, Agent, or Firm* — McGinn IP Law Group, PLLC

(57) ABSTRACT

A method for calibrating a driving amount of an actuator configured to correct blurring of an image taken by a camera attached to a device includes: taking an image of a mark by a camera to generate a first image, the mark reflecting a predetermined posture of the device; detecting a tilt of the mark in the first image; and based on the tilt of the mark, correcting the driving amount of the actuator that is predetermined according to a sensing result of a sensor for sensing a change in a posture of the device.

13 Claims, 16 Drawing Sheets

$AX = X\cos\theta 1 - Y\sin\theta 1$
$AY = X\sin\theta 1 + Y\cos\theta 1$

METHOD FOR CALIBRATING DRIVING AMOUNT OF ACTUATOR CONFIGURED TO CORRECT BLURRING OF IMAGE TAKEN BY CAMERA

This nonprovisional application is based on Japanese Patent Application No. 2016-253390 filed on Dec. 27, 2016 with the Japan Patent Office, the entire contents of which are hereby incorporated by reference.

BACKGROUND OF THE INVENTION

Field of the Invention

The present disclosure relates to a technique for correcting the driving amount of an actuator for correcting blurring of an image taken by a camera.

Description of the Background Art

Conventionally, various techniques for correcting blurring of an image taken by a camera have been proposed. For example, Japanese Patent Laying-Open No. 2016-173517 discloses an image blurring correction device configured to "temperature-correct, among the motor control amounts applied during correction of image blurring, (i) the movement-control amount with the first correction coefficient, and (ii) the hold-control amount used for holding a blurring correction mechanism 110 in the center position with the second correction coefficient" (see "Abstract").

SUMMARY OF THE INVENTION

In recent years, a camera module is mounted in various devices including a mobile phone terminal, a tablet terminal, and the like. Also, as cameras have been increased in resolution and rendered more multifunctional, the number of components mounted in such an information processing terminal has also been increased. Meanwhile, the users are strongly demanding to reduce the weight of the information processing terminal. Thus, the technique for reducing the size of a camera module has been required.

The present disclosure has been made in order to solve the above-described problems. An object in a certain aspect is to provide a technique allowing a reduction of the number of components mounted in a camera module attached to an information processing terminal equipped with a sensor capable of sensing a posture.

Other problems and new characteristics will become apparent from the description of the present specification and the accompanying drawings.

According to an embodiment, a method for calibrating a driving amount of an actuator configured to correct blurring of an image taken by a camera attached to a device is provided. The device includes a sensor for sensing a change in a posture of the device. The above-described method includes: taking an image of a mark by a camera to generate a first image, the mark reflecting a predetermined posture of the device; detecting a tilt of the mark in the first image; and correcting a driving amount of an actuator based on the tilt of the mark, the driving amount being predetermined according to a sensing result of the sensor.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
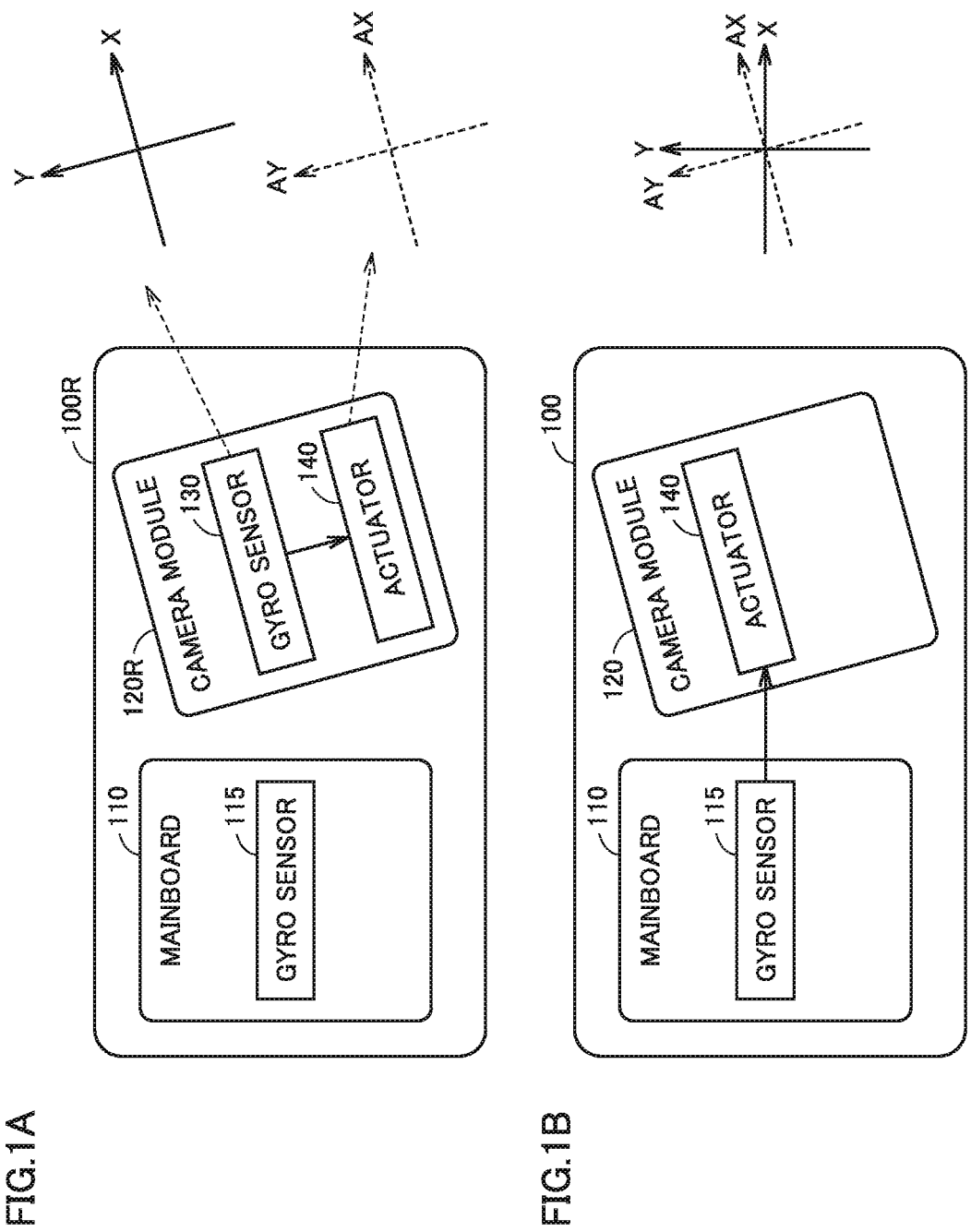
FIG. 1A is a diagram illustrating the configuration of an information processing terminal according to the related art.
FIG. 1B is a diagram illustrating the configuration example of an information processing terminal according to an embodiment.

The embodiments of the present invention will be hereinafter described in detail with reference to the accompanying drawings. In the following description, the same components are designated by the same reference characters. Names and functions thereof are also the same. Accordingly, the detailed description thereof will not be repeated. In addition, embodiments and modifications described later may be selectively combined as appropriate.

[A. Introduction]

FIGS. 1A and 1B each are a diagram for illustrating the outline of the technique according to an embodiment. FIG. 1A is a diagram illustrating the configuration of an information processing terminal 100R according to the related art. FIG. 1B is a diagram illustrating the configuration example of an information processing terminal 100 according to an embodiment.

Referring to FIG. 1A, information processing terminal 100R according to the related art has a mainboard 110 and a camera module 120R. Mainboard 110 is equipped with a gyro sensor 115 as an example of a motion sensor for sensing a change in the posture of information processing terminal 100R. The "posture" means the direction in which the device is directed (for example, the longitudinal direction, the lateral direction, and the height direction of information processing terminal 100R). By way of example, gyro sensor 115 is configured to be capable of sensing the angular velocity about two axes in the longitudinal direction and the lateral direction of information processing terminal 100R. In another aspect, a geomagnetism sensor may be used as another example of the sensor for sensing a change in the posture of information processing terminal 100R. Camera module 120R includes a gyro sensor 130 for sensing a change in the posture of the module, and an actuator 140 for correcting blurring of an image (image blurring) taken by an imaging element included in the module.

Gyro sensor 130 and actuator 140 are provided in the same camera module 120R. Thus, during manufacturing of camera module 120R according to a certain aspect, gyro sensor 130 and actuator 140 are arranged in camera module 120R such that an X axis and a Y axis of gyro sensor 130 coincide with an AX axis and an AY axis, respectively, extending in the direction in which actuator 140 is driven.

Information processing terminal 100R according to the related art drives actuator 140 by the driving amount that is predetermined according to the output (angular velocity) from gyro sensor 130 along the X axis and the output from gyro sensor 130 along the Y axis. Thereby, the lens or the sensor included in camera module 120R is caused to move so as to compensate for image blurring. This predetermined driving amount is set on the precondition that the axes of gyro sensor 130 and the axes of actuator 140 coincide with each other.

Information processing terminal 100R includes two gyro sensors that measure different objects but have the same function. Thus, information processing terminal 100R is increased in number of components as a whole device, which may lead to increased manufacturing cost.

Referring to FIG. 1B, information processing terminal 100 according to the embodiment is different from information processing terminal 100R according to the related art in that camera module 120 does not include gyro sensor 130.

Information processing terminal 100 sets the driving amount of actuator 140 according to the output from gyro sensor 115 attached to mainboard 110 (information processing terminal 100). Thus, information processing terminal 100 according to the embodiment does not need to separately include gyro sensor 130 in camera module 120.

However, as shown in FIG. 1B, camera module 120 may be attached in the state where it is tilted relative to information processing terminal 100. This is because camera module 120 is not fastened to information processing terminal 100 with screws or the like, but is attached to information processing terminal 100 in such a manner that this camera module 120 is wrapped in a shock-absorbing soft material. Accordingly, a plurality of information processing terminals 100 may be individually different in position (tilt) at which camera module 120 is attached to information processing terminal 100. On the other hand, gyro sensor 115 is attached by soldering to information processing terminal 100 almost without being tilted.

Accordingly, when camera module 120 is attached in the state where it is tilted relative to information processing terminal 100, the axes (X, Y) of gyro sensor 115 and the axes (AX, AY) of actuator 140 deviate from each other. In such a situation, when information processing terminal 100 drives actuator 140 by the driving amount that is predetermined according to the output from gyro sensor 115, image blurring cannot be accurately corrected. This is because the predetermined driving amount is set on the precondition that the axes of gyro sensor 115 and the axes of actuator 140 coincide with each other, as described above.

Thus, information processing terminal 100 according to the embodiment detects tilts of (the amount of deviation between) the axes of gyro sensor 115 provided outside camera module 120 and the axes of actuator 140. Based on the detected tilts, information processing terminal 100 corrects the driving amount of actuator 140 that is predetermined according to the output from gyro sensor 115. Thereby, even if gyro sensor 115 provided outside camera module 120 is used for controlling actuator 140, information processing terminal 100 can accurately correct image blurring. In the following, the details of control for correcting the driving amount of actuator 140 will be described.

[B. First Embodiment]

(b1. Inspection System 200)

Figure 2:
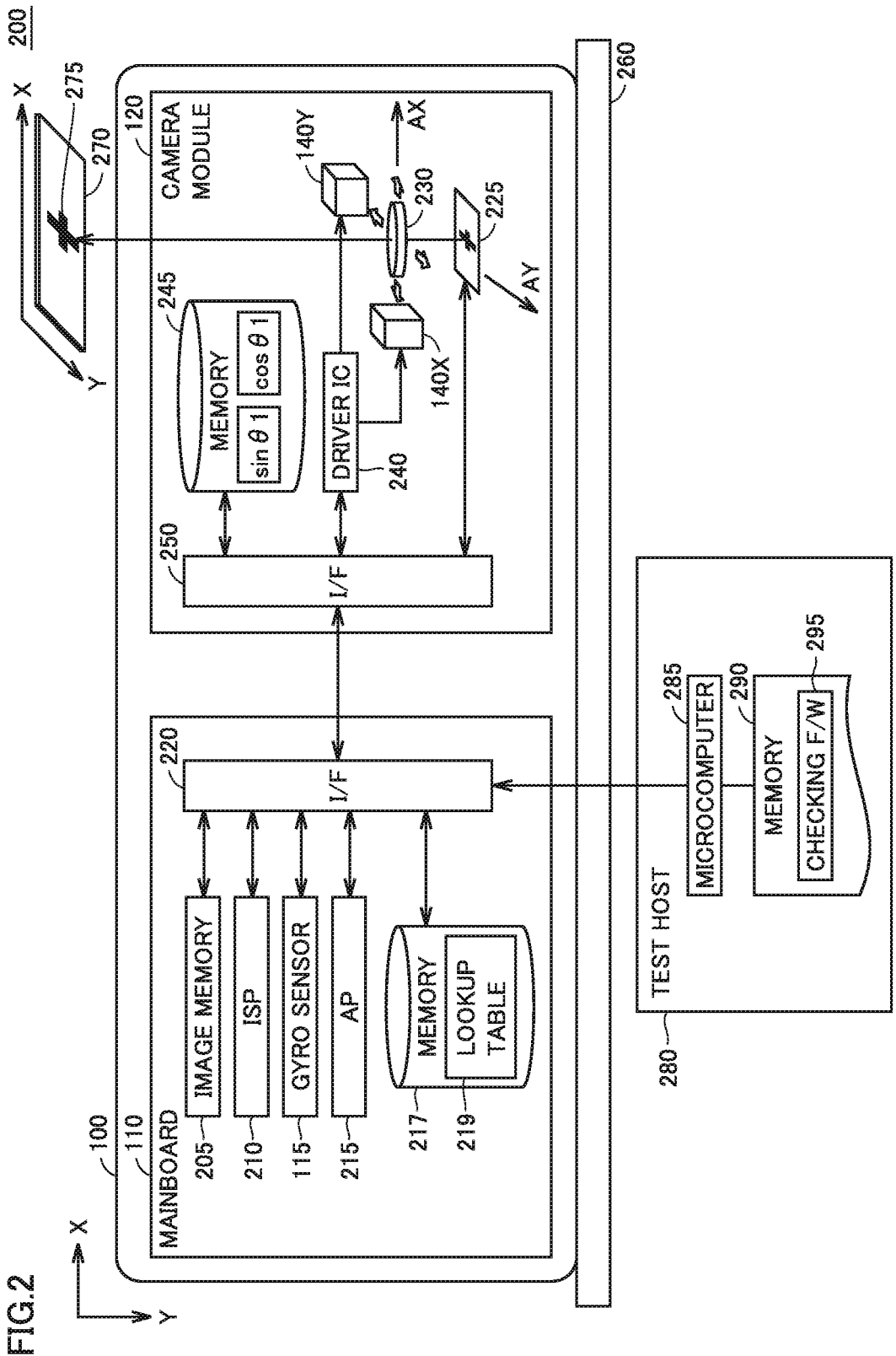
FIG. 2 is a diagram illustrating the configuration example of an inspection system according to the first embodiment.

FIG. 2 is a diagram illustrating the configuration example of an inspection system 200 according to the first embodiment. Inspection system 200 includes an information processing terminal 100, a jig 260, a monitor 270, and a test host 280.

Information processing terminal 100 includes a mainboard 110 and a camera module 120. Mainboard 110 includes an image memory 205, an image signal processor (ISP) 210, a gyro sensor 115, an application processor (AP) 215, a memory 217, and an interface (I/F) 220. I/F 220 is electrically connected to image memory 205, ISP 210, gyro sensor 115, AP 215, memory 217, and I/F 250 described later.

Information processing terminal 100 may be provided with a camera (camera module 120), and further provided with a sensor (for example, a gyro sensor) capable of sensing the posture of a terminal and located outside the camera. Information processing terminal 100 may be a smart phone, a tablet, a monitoring camera, a network camera, and other terminals, for example.

ISP 210 performs image processing for the image data obtained by an image sensor 225, which will be described later. Image processing, for example, includes: correction processing for an optical system; correction for scratches caused by variations of image sensor 225; and the like.

Image memory 205 is configured to store the image data processed by ISP 210. Gyro sensor 115 is configured to sense a change in the posture of information processing terminal 100. Gyro sensor 115 is a sensor of a vibration type, by way of example. In another aspect, gyro sensor 115 may be a sensor of an optical type.

AP 215 executes checking firmware (F/W) 295, which will be described later, to determine the correction coefficient used for calibrating the driving amount of actuator 140 that is predetermined according to the output from gyro sensor 115. Memory 217 stores a lookup table 219 used for determining this correction coefficient.

Camera module 120 includes an image sensor 225, a lens 230, actuators 140X and 140Y, a driver integrated circuit (IC) 240, a memory 245 (for example, a flash memory), and an I/F 250.

Image sensor 225 includes a plurality of photoelectric conversion elements arranged in two directions that are orthogonal to each other. Also, image sensor 225 is configured to generate image data.

Actuator 140X is configured to be capable of driving lens 230 in the AX direction. Actuator 140Y is configured to be capable of driving lens 230 in the AY direction. Actuators 140X and 140Y will be hereinafter collectively referred to as an "actuator 140". Actuator 140 is configured to correct image blurring by moving lens 230 (lens shift scheme).

In another aspect, actuator 140 may be configured to correct image blurring by moving image sensor 225 in place of lens 230 (sensor shift scheme).

Driver IC 240 controls the amount of driving lens 230 by actuator 140. Based on the output from gyro sensor 115, driver IC 240 drives lens 230 so as to correct image blurring in image sensor 225.

Memory 245 stores correction coefficients (sin $\theta 1$, cos $\theta 1$) used for correcting the driving amount by actuator 140 that is predetermined according to the output from gyro sensor 115.

I/F 220 and I/F 250 each are implemented using I2C (registered trademark), MIPI (registered trademark) (Mobile Industry Processor Interface), and other terminals.

Jig 260 fixes information processing terminal 100 in a predetermined posture. Gyro sensor 115 is attached to mainboard 110 such that the X axis and the Y axis of the sensor coincide with the major axis and the minor axis, respectively, of information processing terminal 100.

Monitor 270 is configured to display a chart 275. Chart 275 functions as a mark reflecting the predetermined posture of information processing terminal 100. By way of example, chart 275 has a cross shape including straight lines extending along the X axis and the Y axis of gyro sensor 115.

Test host 280 includes a microcomputer 285 and a memory 290. Memory 290 functions as a nonvolatile storage device, for example. Memory 290 stores checking F/W (firmware) 295.

In a certain aspect, test host 280 may transfer checking F/W 295 to memory 217. AP 215 may read checking F/W 295 from memory 217 onto a random access memory (RAM) (not shown) or the like, and execute this checking F/W 295.

(b2. Axis Deviation Between Gyro Sensor 115 and Actuator 140)

Figure 3B:
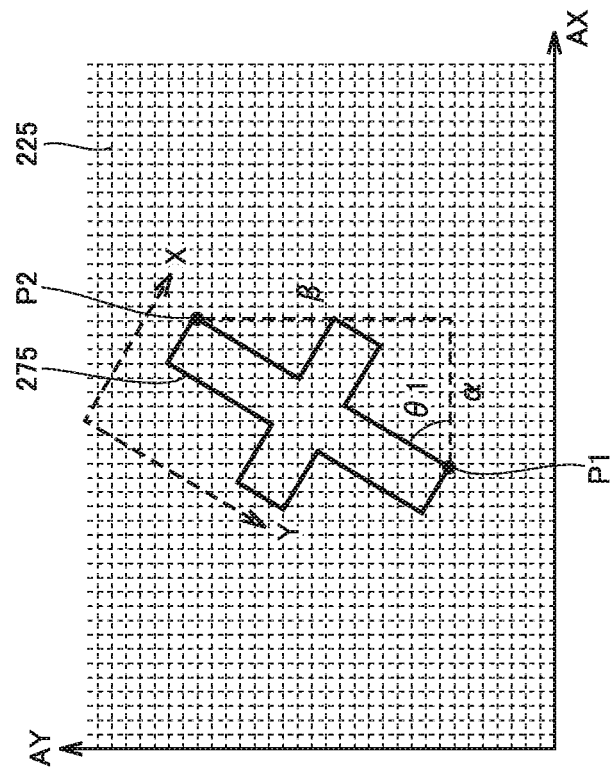
FIG. 3B is a diagram illustrating that the axes of the gyro sensor and the axes of the actuator deviate from each other.
Figure 3A:
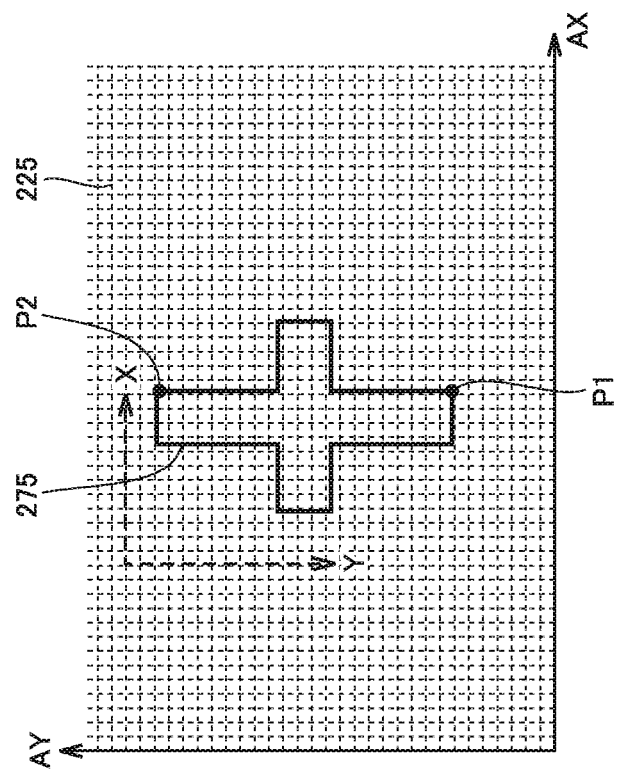
FIG. 3A is a diagram illustrating that the axes of a gyro sensor and the axes of an actuator coincide with each other.

FIGS. 3A and 3B each are a diagram illustrating deviations between the axes of gyro sensor 115 and the axes of actuator 140. FIG. 3A is a diagram illustrating that the axes of gyro sensor 115 and the axes of actuator 140 coincide with each other. FIG. 3B is a diagram illustrating that the axes of gyro sensor 115 and the axes of actuator 140 deviate from each other.

In the first embodiment, the directions in which a plurality of photoelectric conversion elements forming image sensor 225 are arranged correspond to the axis directions of actuator 140 (that is, the AX direction and the AY direction).

In examples shown in FIGS. 3A and 3B, image sensor 225 takes an image of chart 275 displayed on monitor 270 in the state where information processing terminal 100 is fixed to jig 260.

In FIG. 3A, the directions in which the bars forming the cross shape of chart 275 extend correspond to the axis directions of image sensor 225. As described above, the directions in which the bars forming the cross shape of chart 275 extend correspond to the axis directions (the X axis and the Y axis) of gyro sensor 115. Then, the axis directions of image sensor 225 correspond to the axis directions (the AX axis and the AY axis) of actuator 140. In other words, in the example shown in FIG. 3A, the axis directions (the AX axis and the AY axis) of actuator 140 correspond to the axis directions (the X axis and the Y axis) of gyro sensor 115.

In a certain aspect, based on the image including chart 275 taken by image sensor 225, AP 215 determines whether the axis directions of actuator 140 correspond to the axis directions of gyro sensor 115 or not.

AP 215 performs edge processing for an image to thereby detect chart 275. AP 215 further specifies the coordinates of representative points P1 and P2 in chart 275. By way of example, representative points P1 and P2 are defined as ends of a straight line extending along the Y axis. When the positions of representative points P1 and P2 coincide with each other in the AX direction, AP 215 may determine that the axis directions of actuator 140 coincide with the axis directions of gyro sensor 115.

In FIG. 3B, the directions in which the bars forming a cross shape of chart 275 extend do not coincide with (are tilted relative to) the axis directions of image sensor 225. In a certain aspect, AP 215 derives difference information ($\alpha$, $\beta$) about the coordinates of representative points P1 and P2. Based on this difference information, AP 215 calculates a tilt angle $\theta 1$ of chart 275 relative to each axis direction of image sensor 225. More specifically, AP 215 computes a tan (arc tangent) ($\beta/\alpha$) to calculate an angle $\theta 1$.

As described above, the directions in which the bars forming the cross shape of chart 275 extend correspond to the axis directions (the X axis, the Y axis) of gyro sensor 115. Then, the axis directions of image sensor 225 correspond to the axis directions (the AX axis, the AY axis) of actuator 140. In other words, tilt angle $\theta 1$ of chart 275 relative to one axis direction of image sensor 225 shows an angle formed between one axis direction of gyro sensor 115 and one axis direction of actuator 140 (that is, an axis deviation angle).

Figure 4:
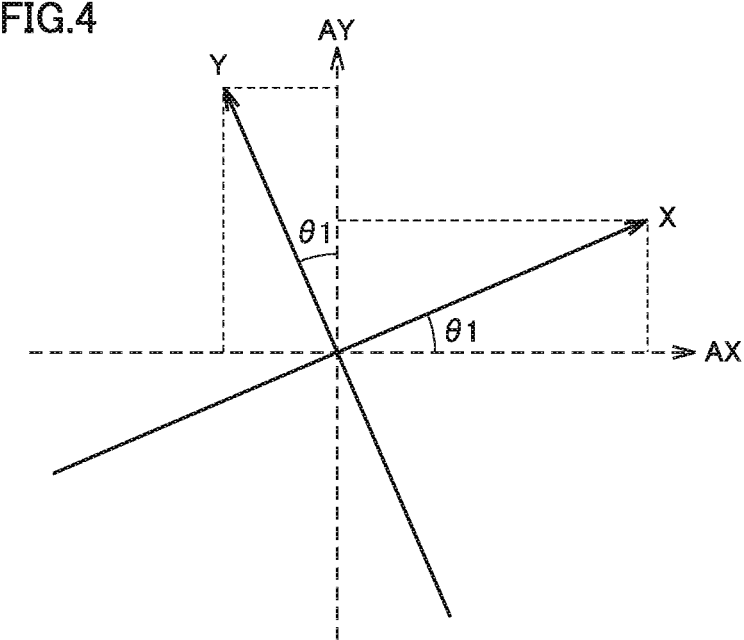
FIG. 4 is a diagram illustrating a correction coefficient used for correcting the driving amount of the actuator.

FIG. 4 is a diagram illustrating the correction coefficient used for correcting the driving amount of actuator 140. In the example shown in FIG. 4, the axes (X, Y) of gyro sensor 115 deviate by an angle $\theta 1$ from the axes (AX, AY) of actuator 140.

As described above, when actuator 140 is driven by the driving amount that is predetermined according to the output from gyro sensor 115 in the state where these axes deviate from each other, image blurring cannot be accurately corrected. This is because the predetermined driving amount is set on the precondition that the axes of gyro sensor 115 and the axes of actuator 140 coincide with each other.

Thus, based on axis deviation angle $\theta 1$, AP 215 determines the correction coefficient used for correcting the predetermined driving amount of actuator 140.

Referring to FIG. 4, the AX-axis component is a value obtained by subtracting the value, which is obtained by multiplying the Y-axis component by sin $\theta 1$, from the value, which is obtained by multiplying the X-axis component by cos $\theta 1$. The AY axis component is a value obtained by adding the value, which is obtained by multiplying the X-axis component by sin $\theta 1$ and the value, which is obtained by multiplying the Y-axis component by cos $\theta 1$. In other words, when sin $\theta 1$ and cos $\theta 1$ are fixed, the output from gyro sensor 115 can be converted into each axis direction of actuator 140. Thus, based on axis deviation angle $\theta 1$, AP 215 determines correction coefficients sin $\theta 1$ and cos $\theta 1$.

AP 215 outputs the determined correction coefficients to camera module 120 through I/F 220. Camera module 120 stores these correction coefficients in memory 245.

Driver IC 240 uses the correction coefficients stored in memory 245 to correct the driving amount of the actuator that is predetermined according to the output from gyro sensor 115. More specifically, driver IC 240 adds or subtracts the value multiplied by each correction coefficient to or from the predetermined driving amount (the X-axis component and the Y-axis component), thereby converting the driving amount into each axis direction of actuator 140.

(3. Control Flow for Calculating Correction Coefficient)

Figure 5:
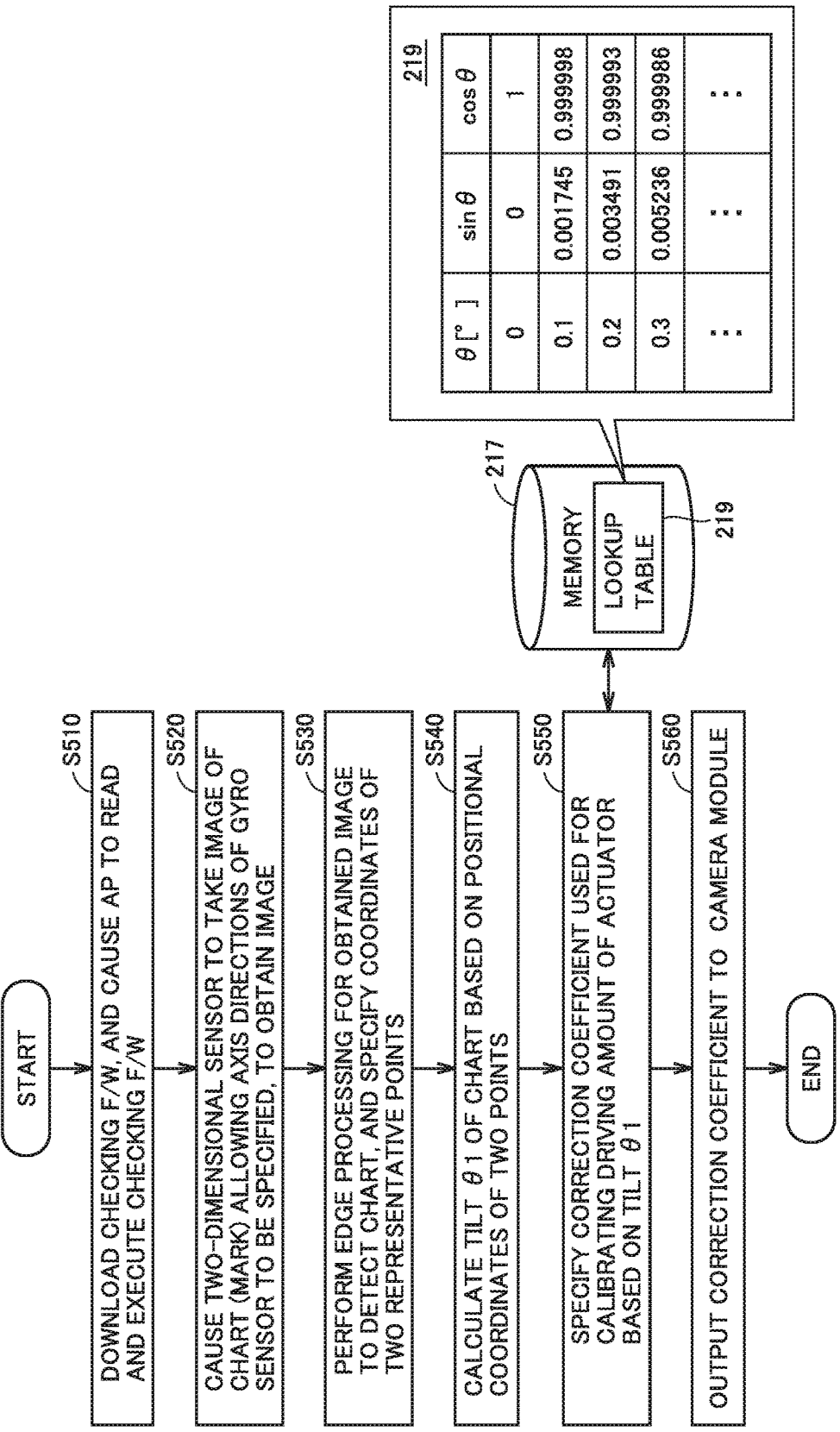
FIG. 5 is a flowchart for illustrating the control flow in which an application processor (AP) calculates a correction coefficient, according to the first embodiment.

FIG. 5 is a flowchart for illustrating the control flow in which AP 215 calculates a correction coefficient, according to the first embodiment. The process executed in steps S520 to S560 shown in FIG. 5 is implemented by AP 215 executing checking F/W 295. In another aspect, some or all of the process may be executed by a circuit element and other hardware.

In step S510, information processing terminal 100 downloads checking F/W 295 from test host 280, and stores the downloaded checking F/W 295 in memory 217. AP 215 reads checking F/W 295 from memory 217 and executes this checking F/W 295.

In step S520, through I/F 220 and I/F 250, AP 215 outputs an instruction to image sensor 225 to take an image. Thereby, image sensor 225 generates image data including chart 275 configured to allow the axis directions of gyro sensor 115 to be specified. Image sensor 225 outputs the generated image data to ISP 210. ISP 210 performs prescribed image processing for the image data, and stores the image-processed image data in image memory 205.

In step S530, AP 215 performs edge processing for the image data stored in image memory 205, to detect chart 275. AP 215 further specifies the coordinates of two representative points from the detected chart 275.

In step S540, AP 215 calculates a tilt angle $\theta1$ (axis deviation angle $\theta1$) of chart 275 based on the specified coordinates of two points.

In step S550, AP 215 refers to lookup table 219 stored in memory 217 to determine correction coefficients sin $\theta1$ and cos $\theta1$ for axis deviation angle $\theta1$. These correction coefficients are values used for calibrating the driving amount of actuator 140 that is predetermined according to the output from gyro sensor 115. As shown in FIG. 5, lookup table 219 holds the angles, the sine function values and the cosine function values for the angles in association with one another.

In another aspect, AP 215 may be configured to calculate correction coefficients sin $\theta1$ and cos $\theta1$ for axis deviation angle $\theta1$, not by using lookup table 219, but by using the application for calculating known trigonometric functions.

In step S560, AP 215 outputs the specified correction coefficients to camera module 120. Camera module 120 stores the inputted correction coefficients in memory 245.

(b4. Control Flow for Correcting Image Blurring)

Figure 6:
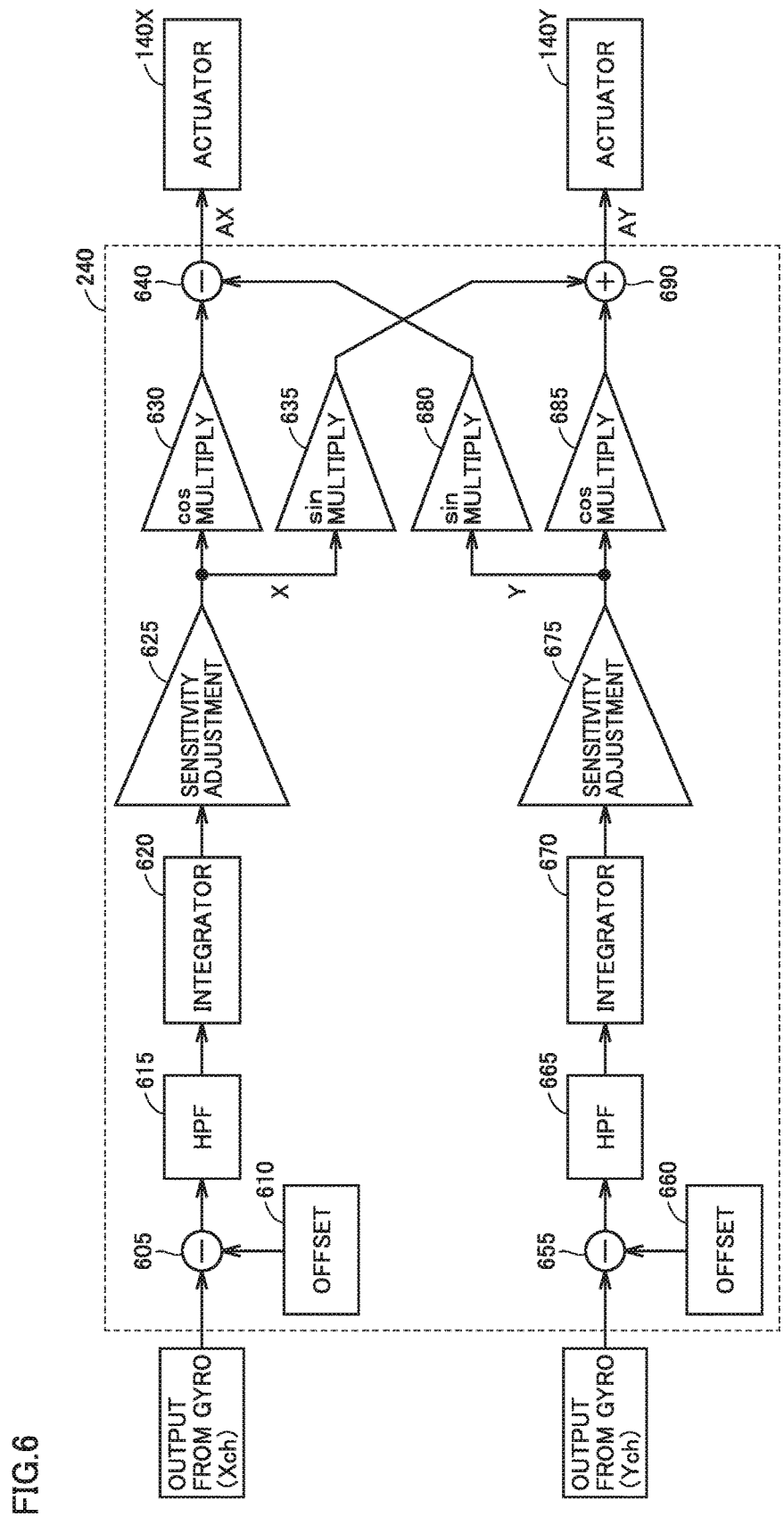
FIG. 6 is a diagram illustrating the control flow for a driver integrated circuit (IC) to correct image blurring.

FIG. 6 is a diagram illustrating the control flow for driver IC 240 to correct image blurring. Referring to FIG. 6, driver IC 240 includes subtractors 605, 640, 655, offsets 610, 660, high pass filters (HPF) 615, 665, integrators 620, 670, sensitivity adjustment units 625, 675, cos multipliers 630, 685, sin multipliers 635, 680, and an adder 690.

Subtractor 605 subtracts an offset voltage, which is output from offset 610, from the voltage value showing the angular velocity about the X-axis direction that is output from gyro sensor 115. The output from offset 610 (and offset 660) corresponds to the output from gyro sensor 115 in the stationary state, and is set in advance in the manufacturing stage. In another aspect, the output from offset 610 may vary according to temperature. Due to the effects of offset 610 and subtractor 605, the time period (convergence time) required to remove the DC offset component in an HFP 615 described later may be shortened.

Then, HPF 615 removes the DC offset component for a reference voltage from the signal output from subtractor 605. Integrator 620 integrates the signal input from HPF 615. Sensitivity adjustment unit 625 performs the process of amplifying the signal output from integrator 620. Sensitivity adjustment unit 625 outputs the amplified signal to a cos multiplier 630 and a sin multiplier 635.

The angular velocity about the Y-axis direction, which is output from gyro sensor 115, is also subjected to the same process as described above. Accordingly, the description about the processes performed by subtractor 655, offset 660, HPF 665, integrator 670, and sensitivity adjustment unit 675 will not be repeated.

Then, cos multiplier 630 outputs, to subtractor 640, the value obtained by multiplying the output from sensitivity adjustment unit 625 by a correction coefficient cos $\theta1$ stored in memory 245. Then, sin multiplier 635 outputs, to adder 690, the value obtained by multiplying the output from sensitivity adjustment unit 625 by a correction coefficient sin $\theta1$.

Then, sin multiplier 680 outputs, to subtractor 640, the value obtained by multiplying the output from sensitivity adjustment unit 675 by correction coefficient sin $\theta1$. Then, cos multiplier 685 outputs, to adder 690, the value obtained by multiplying the output from sensitivity adjustment unit 675 by correction coefficient cos $\theta1$.

Subtractor 640 outputs, to actuator 140X, the value obtained by subtracting the output of sin multiplier 680 from the output of cos multiplier 630. Adder 690 outputs, to actuator 140Y, the value obtained by adding the output of sin multiplier 635 and the output of cos multiplier 685.

According to the above description, camera module 120 for which a correction coefficient is set by inspection system 200 can accurately correct image blurring by using gyro sensor 115 disposed outside camera module 120. Thus, according to the inspection method by inspection system 200 (checking F/W 295), the number of components in information processing terminal 100 can be reduced, so that information processing terminal 100 can be reduced in size, weight and manufacturing cost.

Furthermore, the inspection method according to inspection system 200 allows omission of the process of adjusting the sensitivity of gyro sensor 115 by applying vibration, which has been conventionally performed. Thus, according to this inspection method, the driving amount of the actuator may be calibrated at low cost without requiring a vibration device.

In addition, in the above-mentioned method, calibration may be performed based on the correct trigonometric function values by referring to the lookup table. Thus, according to the above-mentioned method, image blurring can be accurately corrected.

Figure 7:
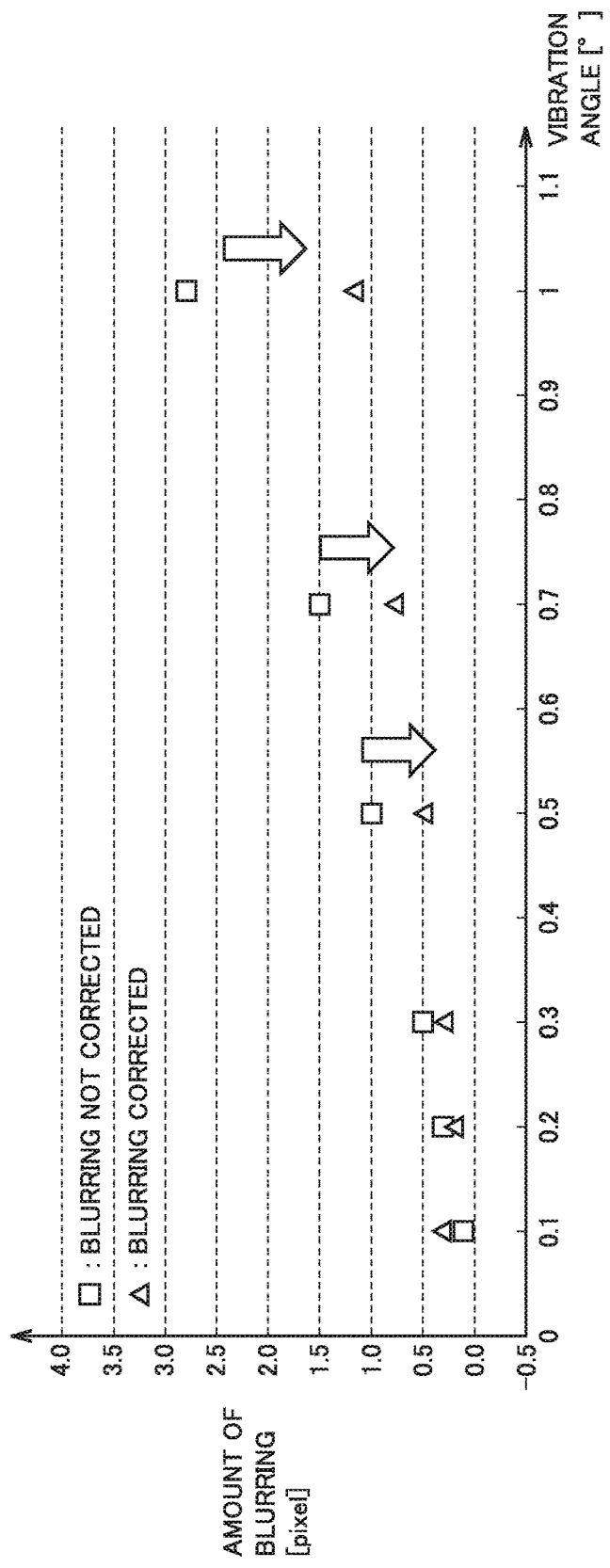
FIG. 7 is a diagram illustrating the degree of correcting image blurring according to the first embodiment.

FIG. 7 is a diagram illustrating the degree of correcting image blurring according to the first embodiment. In FIG. 7, the horizontal axis shows the degree of applying vibration (angle) while the vertical axis shows the amount of blurring. The vibration angle shows the angle at which information processing terminal 100 tilts in the time period (shutter time) during which image sensor 225 takes in the quantity of light. In FIG. 7, axis deviation angle $\theta1$ between one axis of gyro sensor 115 and one axis of actuator 140 is assumed to be 3 degrees. The amount of blurring shows the degree (pixel) of broadening of the photographic subject due to blurring.

As shown in FIG. 7, by the method of correcting image blurring (control shown in FIG. 6) according to the first embodiment, the amount of blurring can be reduced as compared with the case where blurring is not corrected. For example, when vibration of 0.7 degree is applied, the amount of blurring is reduced from 1.5 pixel to less than 1.0 pixel.

(b4. Modification 1)

In the above-described example, AP 215 is configured to determine the correction coefficients for axis deviation angle $\theta 1$ by referring to lookup table 219. However, lookup table 219 has relatively large data volume, so that this lookup table 219 may require a relatively large area in memory 217 of information processing terminal 100. On the other hand, when the correction coefficients are determined by computation of the trigonometric functions, a computation engine with high performance (the throughput of AP 215) may be required. Thus, AP 215 according to the modification calculates correction coefficients sin $\theta 1$ and cos $\theta 1$ based on axis deviation angle $\theta 1$ by linear approximation.

Figure 8:
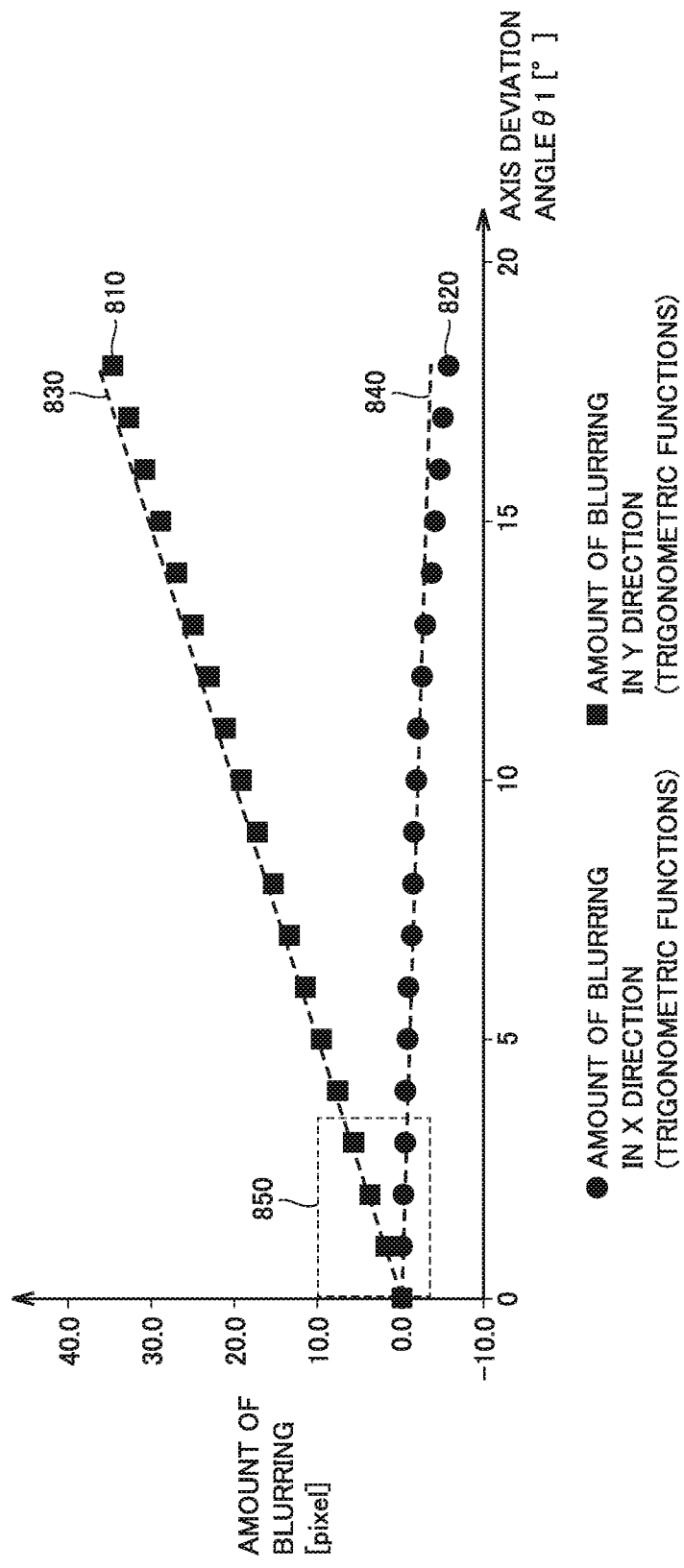
FIG. 8 is a diagram illustrating the relation between an axis deviation angle θ1 and the amount of blurring.

FIG. 8 is a diagram illustrating the relation between axis deviation angle $\theta 1$ and the amount of blurring. In FIG. 8, the angle of applying vibration is assumed to be 1.5 degrees. A distribution 810 shows the amount of blurring in the Y direction with respect to axis deviation angle $\theta 1$. A distribution 820 shows the amount of blurring in the X direction with respect to axis deviation angle $\theta 1$. A straight line 830 represents a line obtained by linear approximation of distribution 810. A straight line 840 represents a line obtained by linear approximation of distribution 820.

As shown in FIG. 8, in a region 850 in which axis deviation angle $\theta 1$ is less than 3 degrees, there are almost no errors between distribution 810 and straight line 830, and also between distribution 820 and straight line 840. In most cases, axis deviation angle $\theta 1$ caused by attachment of camera module 120 to information processing terminal 100 is also less than 3 degrees.

Accordingly, the information processing terminal according to the modification stores, in memory 217, the linear approximate expression of the sine function value and the linear approximate expression of the cosine function value in a small angle (for example, less than 3 degrees). After axis deviation angle $\theta 1$ is detected, AP 215 (checking F/W 295) according to the modification calculates correction coefficients sin $\theta 1$ and cos $\theta 1$ according to these linear approximate expressions.

In view of the above description, by the inspection method according to the modification, a correction coefficient can be simply calculated without requiring lookup table 219. Thus, by the inspection method according to the modification, the manufacturing cost for information processing terminal 100 can be further reduced as compared with the inspection method according to the first embodiment.

(b5. Modification 2)

In the above-described example, chart 275 has a cross shape formed by bars specifying the axes of gyro sensor 115, but the shape of chart 275 is not limited to a cross shape. Chart 275 only has to have a shape that can specify axis deviation angle $\theta 1$ between each axis of gyro sensor 115 and each axis of actuator 140.

Figure 9:
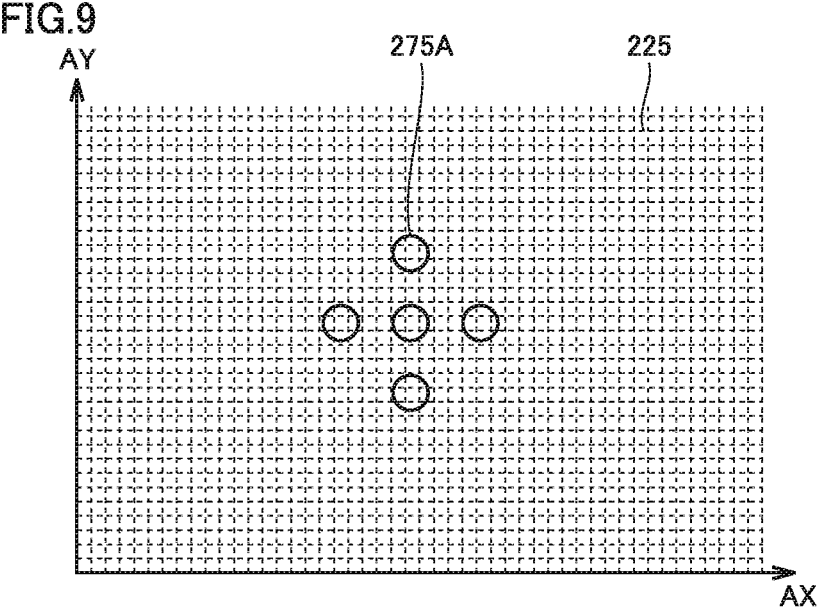
FIG. 9 is a diagram illustrating a chart according to a modification.
Figure 10:
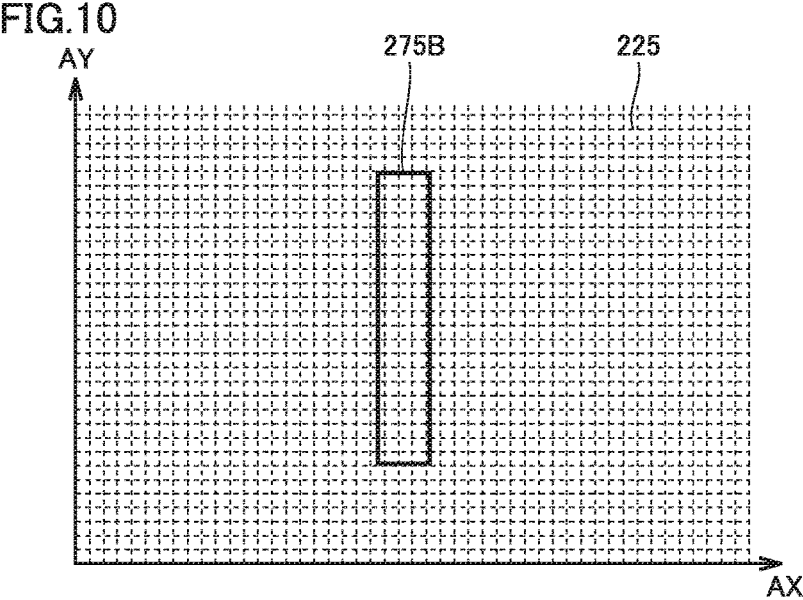
FIG. 10 is a diagram illustrating a chart according to another modification.

FIG. 9 is a diagram illustrating a chart 275A according to a modification. FIG. 10 is a diagram illustrating a chart 275B according to a modification. As shown in FIG. 9, axis deviation angle $\theta 1$ may be specified also by chart 275A formed by combining a plurality of circles. Furthermore, as shown in FIG. 10, axis deviation angle $\theta 1$ may be specified also by chart 275B formed by a rectangular shape defining one of the axis directions of gyro sensor 115.

(b6. Modification 3)

In the above-described example, information processing terminal 100 is configured to be fixed to jig 260. In another aspect, the inspection system further includes a camera for taking an image of information processing terminal 100. AP 215 specifies the outside-diameter line of information processing terminal 100 by image processing, and specifies the major axis (that is, the X axis) and the minor axis (that is, the Y axis) of information processing terminal 100. Thereby, chart 275 extending in the X-axis direction and the Y-axis direction may be displayed on monitor 270. In this case, the inspection system does not require jig 260 for fixing information processing terminal 100 in a predetermined posture.

(b7. Modification 4)

In the above-described example, chart 275 is configured to be displayed on monitor 270. In another aspect, chart 275 may be formed not on monitor 270 but on a recording medium (a sheet of paper, and the like).

[C. Second Embodiment]

(c1. Axis Deviation Between Actuator 140 and Image Sensor 225)

Figure 11:
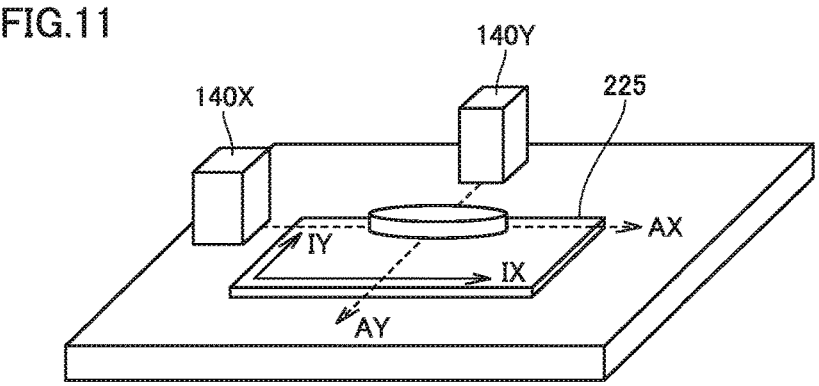
FIG. 11 is a diagram illustrating deviations between the axes of the actuator and the axes of an image sensor.

FIG. 11 is a diagram illustrating deviations between the axes of actuator 140 and the axes of image sensor 225. The axes of image sensor 225 extend in the directions in which a plurality of photoelectric conversion elements forming image sensor 225 are arranged.

In the first embodiment, it is assumed that the axes (AX, AY) of actuator 140 and the axes (IX, IY) of image sensor 225 coincide with each other. However, these axes may deviate from each other depending on the accuracy of attaching actuator 140 and image sensor 225 during manufacturing of camera module 120.

In the method of correcting the driving amount of actuator 140 according to the first embodiment, the output from gyro sensor 115 is converted into each axis direction of image sensor 225. Accordingly, by this method, image blurring cannot be accurately corrected if the axes of actuator 140 and the axes of image sensor 225 deviate from each other.

Thus, in the inspection method according to the second embodiment, the driving amount of actuator 140 that is predetermined according to the output from gyro sensor 115 is corrected in consideration of axis deviation angle $\theta 2$ between each axis of actuator 140 and each axis of image sensor 225.

In addition, the configuration of the inspection system according to the second embodiment is the same as the configuration of inspection system 200 according to the first embodiment. Accordingly, the detailed description of the configuration of the inspection system will not be repeated.

Figure 12A:
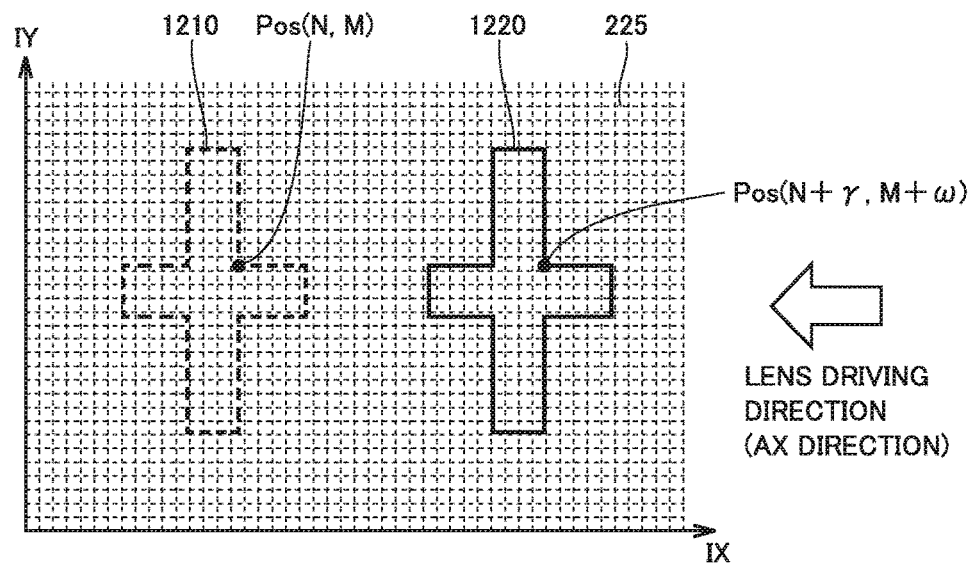
FIG. 12A is a diagram illustrating that the axes of the actuator and the axes of the image sensor coincide with each other.
Figure 12B:
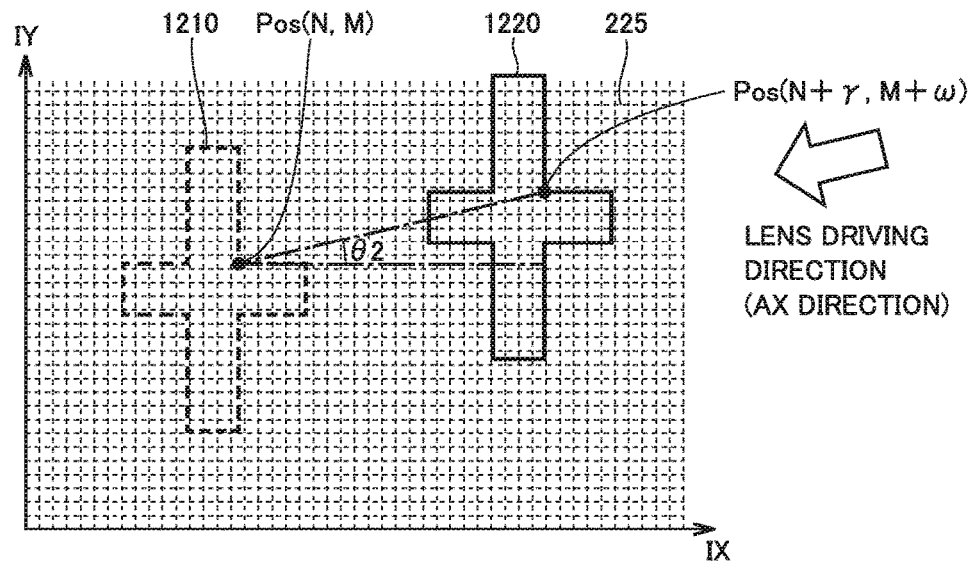
FIG. 12B is a diagram illustrating that the axes of the actuator and the axes of the image sensor deviate from each other.

FIGS. 12A and 12B each are a diagram illustrating the method for specifying axis deviation angle $\theta 2$ between each axis of actuator 140 and each axis of image sensor 225. FIG. 12A is a diagram showing that the axes of actuator 140 and the axes of image sensor 225 coincide with each other. FIG. 12B is a diagram showing that the axes of actuator 140 and the axes of image sensor 225 deviate from each other.

In FIGS. 12A and 12B, after image sensor 225 takes an image of chart 275 to generate the first image, driver IC 240 causes lens 230 to move in the AX-axis direction of actuator 140. Then, image sensor 225 takes an image of chart 275 again to generate the second image.

In FIGS. 12A and 12B, a chart 1210 corresponds to chart 275 in the first image while a chart 1220 corresponds to chart 275 in the second image.

Referring to FIG. 12A, when the axes of actuator 140 and the axes of image sensor 225 coincide with each other, the positions of chart 1210 and chart 1220 along the IY direction before and after lens 230 is moved in the AX direction coincide with each other. On the other hand, referring to FIG. 12B, when the axes of actuator 140 and the axes of image sensor 225 deviate from each other, the positions of chart 1210 and chart 1220 deviate from each other in the IY direction.

Based on the amount of change in coordinates of a representative point Pos in chart 275, AP 215 (checking F/W) according to the second embodiment may specify axis deviation angle θ2 between each axis of actuator 140 and each axis of image sensor 225. By way of example, representative point Pos is defined as a cross point between the straight line extending in the X axis and the straight line extending in the Y axis.

AP 215 specifies the coordinates (N, M) of representative point Pos in chart 1210 included in the first image. Then, AP 215 specifies the coordinates (N+γ, M+ω) of representative point Pos in chart 1220 included in the second image. AP 215 further specifies the difference information (γ, ω) between these coordinates, to calculate axis deviation angle θ2 based on this difference information. More specifically, AP 215 computes a tan (ω/γ) to calculate axis deviation angle θ2.

(c2. Control Flow for Calculating Correction Coefficient)

Figure 13:
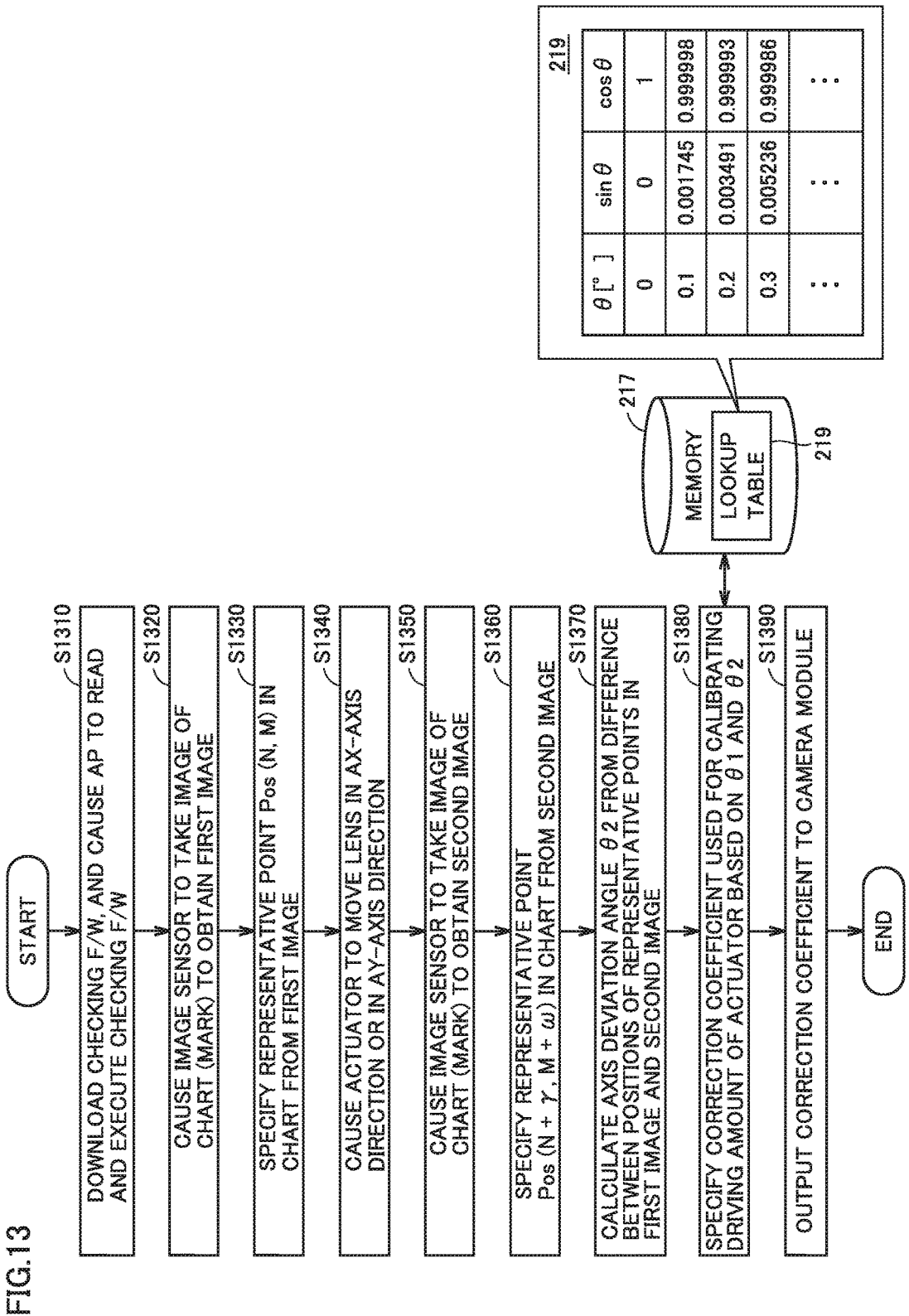
FIG. 13 is a flowchart for illustrating the control flow in which an AP calculates a correction coefficient, according to the second embodiment.

FIG. 13 is a flowchart for illustrating the control flow in which AP 215 calculates a correction coefficient, according to the second embodiment. The process executed in steps S1320 to S1390 shown in FIG. 13 is implemented when AP 215 executes checking F/W according to the second embodiment. In another aspect, some or all of the process may be executed by a circuit element and other hardware. In addition, by executing the process in steps S510 to step S550 in FIG. 5, AP 215 has already recognized axis deviation angle θ1 between each axis of gyro sensor 115 and each axis of actuator 140.

In step S1310, AP 215 downloads checking F/W according to the second embodiment from test host 280, and stores the downloaded checking F/W in memory 217. AP 215 reads checking F/W from memory 217, and executes this checking F/W.

In step S1320, through I/F 220 and I/F 250, AP 215 outputs an instruction to image sensor 225 to take an image. Thereby, image sensor 225 takes an image of chart 275 and generates the first image. The first image is subjected to prescribed image processing by ISP 210 and thereafter stored in image memory 205.

In step S1330, AP 215 performs edge processing for the first image, and specifies chart 1210. AP 215 further specifies the coordinates (N, M) of representative point Pos in chart 1210, and stores the coordinates in memory 217 or a RAM (not shown).

In step S1340, through I/F 220 and I/F 250, AP 215 outputs an instruction to driver IC 240 to move lens 230. Thereby, driver IC 240 causes actuator 140X or 140Y to move lens 230 in the AX-axis direction or in the AY-axis direction.

In step S1350, AP 215 outputs an instruction to image sensor 225 to take an image. Thereby, image sensor 225 takes an image of chart 275 and generates the second image. The second image is stored in image memory 205.

In step S1360, as in step S1330, AP 215 specifies the coordinates (N+γ, M+ω) of representative point Pos in chart 1220 included in the second image, and stores the data showing the specified coordinates in memory 217 or a RAM (not shown).

In step S1370, based on the coordinates (N, M) of representative point Pos in the first image and the coordinates (N+γ, M+ω) of representative point Pos in the second image, AP 215 specifies the difference information (γ, ω). AP 215 further calculates axis deviation angle θ2 based on the difference information. In step S1380, AP 215 specifies the correction coefficient based on axis deviation angle θ2 and the already specified axis deviation angle θ1. More specifically, AP 215 determines whether or not the direction (rotation direction) in which the axes of image sensor 225 deviate from the axes of gyro sensor 115 is the same as the direction in which the axes of actuator 140 deviate from the axes of image sensor 225. If AP 215 determines that these axes deviate in the same direction, AP 215 specifies the correction coefficient for an angle (θ1+θ2) from lookup table 219. On the other hand, if AP 215 determines that these axes deviate in different directions, AP 215 specifies the correction coefficient for an angle (θ1−θ2) from lookup table 219.

In step S1390, AP 215 outputs the specified correction coefficient to camera module 120. Camera module 120 stores the inputted correction coefficient in memory 245.

In view of the above description, by the inspection method according to the second embodiment, the driving amount of actuator 140 predetermined according to the output from gyro sensor 115 can be calibrated also in consideration of the axis deviations between the axes of actuator 140 and the axes of image sensor 225. Thus, the inspection method according to the second embodiment allows more accurate correction of image blurring as compared with the inspection method according to the first embodiment.

[D. Third Embodiment]

In the inspection method according to the above-described embodiment, axis deviation angle θ1 (and θ2) is calculated based on the image obtained by taking an image of the chart to thereby determine, based on this axis deviation angle, the correction coefficient used for correcting the driving amount of actuator 140. In the inspection method according to the third embodiment, information processing terminal 100 is vibrated to thereby determine, based on the output from gyro sensor 115 (vibration information) obtained at the time, the correction coefficient used for correcting the driving amount of actuator 140.

(d1. Inspection System 1400)

Figure 14:
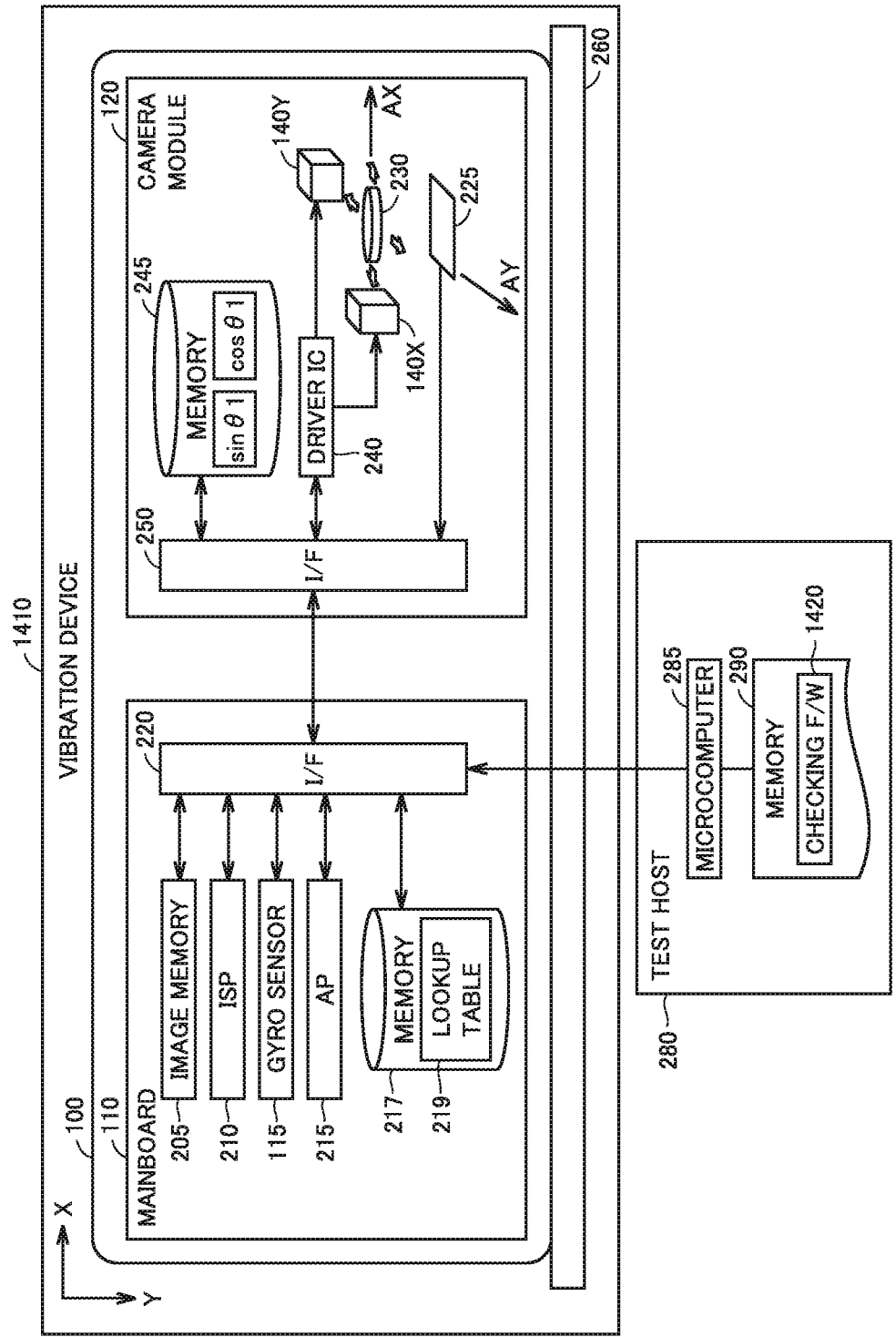
FIG. 14 is a diagram illustrating the configuration example of an inspection system according to the third embodiment.

FIG. 14 is a diagram illustrating the configuration example of an inspection system 140 according to the third embodiment. Since the portions designated by the same reference characters in FIG. 2 are the same as those in FIG. 2, the description thereof will not be repeated.

Inspection system 1400 is different from inspection system 200 illustrated in FIG. 2 in that a vibration device 1410 is included, that checking F/W 1420 in place of checking F/W 295 is stored in memory 290, and that monitor 270 is not provided.

(d2. Axis Deviation Between Gyro Sensor 115 and Actuator 140)

Figure 15:
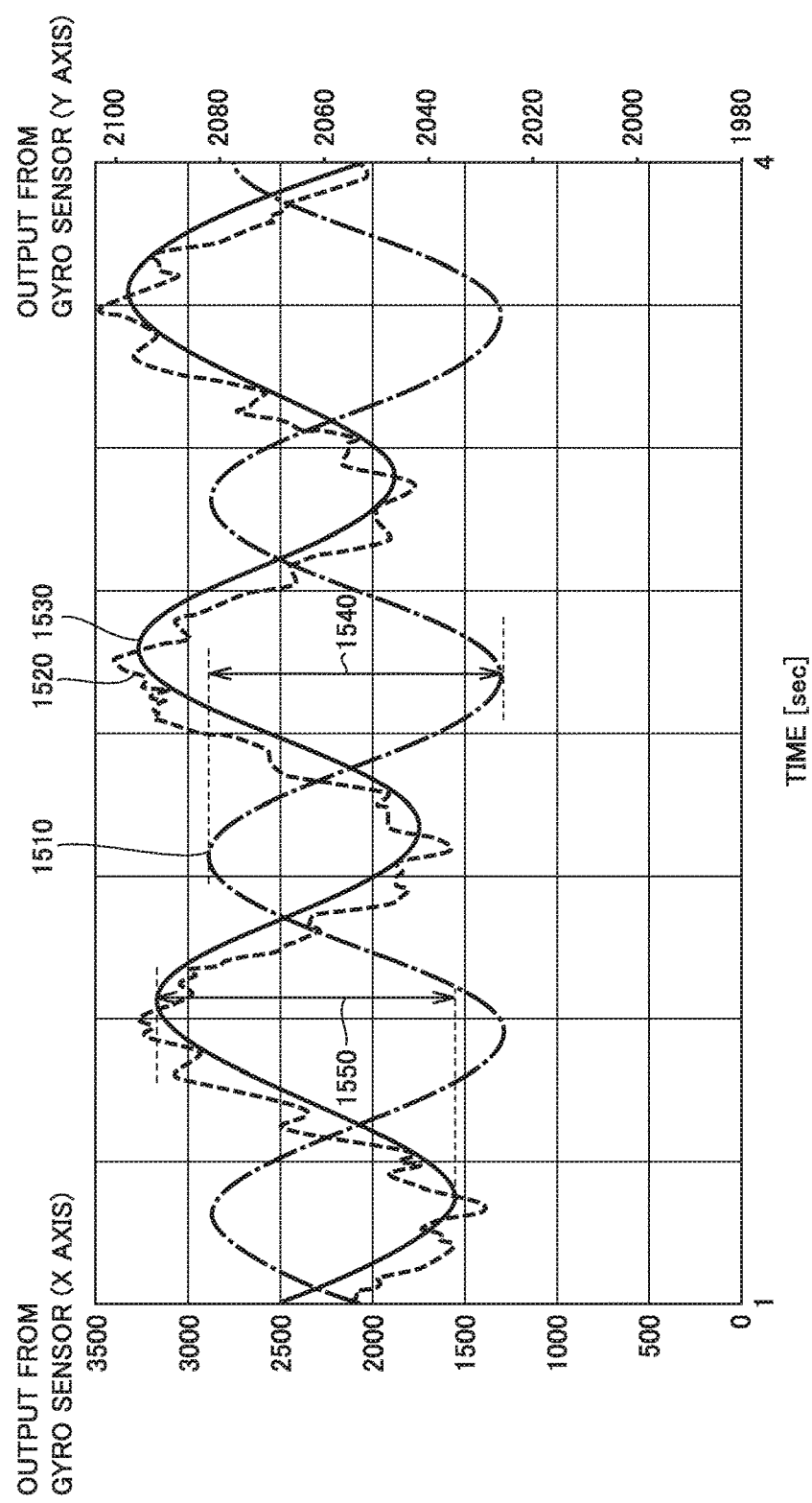
FIG. 15 is a diagram illustrating a method of detecting an axis deviation angle according to the third embodiment.

FIG. 15 is a diagram illustrating a method of detecting the axis deviation angle according to the third embodiment. In FIG. 15, the horizontal axis shows time while the vertical axis shows the output from gyro sensor 115 (the value obtained by A/D conversion of the voltage). FIG. 15 shows an example of the output from gyro sensor 115 obtained when a vibration table 1410 is used to apply vibration to information processing terminal 100 by 1 degree about the AX axis of actuator 140 (in the yaw direction).

A curved line 1510 shows the output from gyro sensor 115 along the X axis (in the yaw direction). A curved line 1520 shows the output from gyro sensor 115 along the Y axis (in the pitch direction). A curved line 1530 shows the data obtained by performing filtering processing (for example, smoothing processing) for curved line 1520. The X-axis direction of gyro sensor 115 extends approximately in the same direction as the AX-axis direction of actuator 140.

When the axes (X, Y) of gyro sensor 115 and the axes (AX, AY) of actuator 140 deviate from each other, the output from gyro sensor 115 along the X axis is reduced with respect to vibration applied in the yaw direction. Furthermore, the output from gyro sensor 115 along the Y axis is generated.

In the inspection method according to the fourth embodiment, axis deviation angle θ1 between each axis of gyro sensor 115 and each axis of actuator 140 is calculated by utilizing the above-described characteristics. More specifically, AP 215 calculates an amplitude 1540 of curved line 1510, and an amplitude 1550 of curved line 1530. Then, AP 215 calculates the ratio of amplitude 1550 to amplitude 1540. Then, AP 215 computes a tan of the calculated ratio to calculate axis deviation angle θ1.

(d3. Control Flow for Calculating Correction Coefficient)

Figure 16:
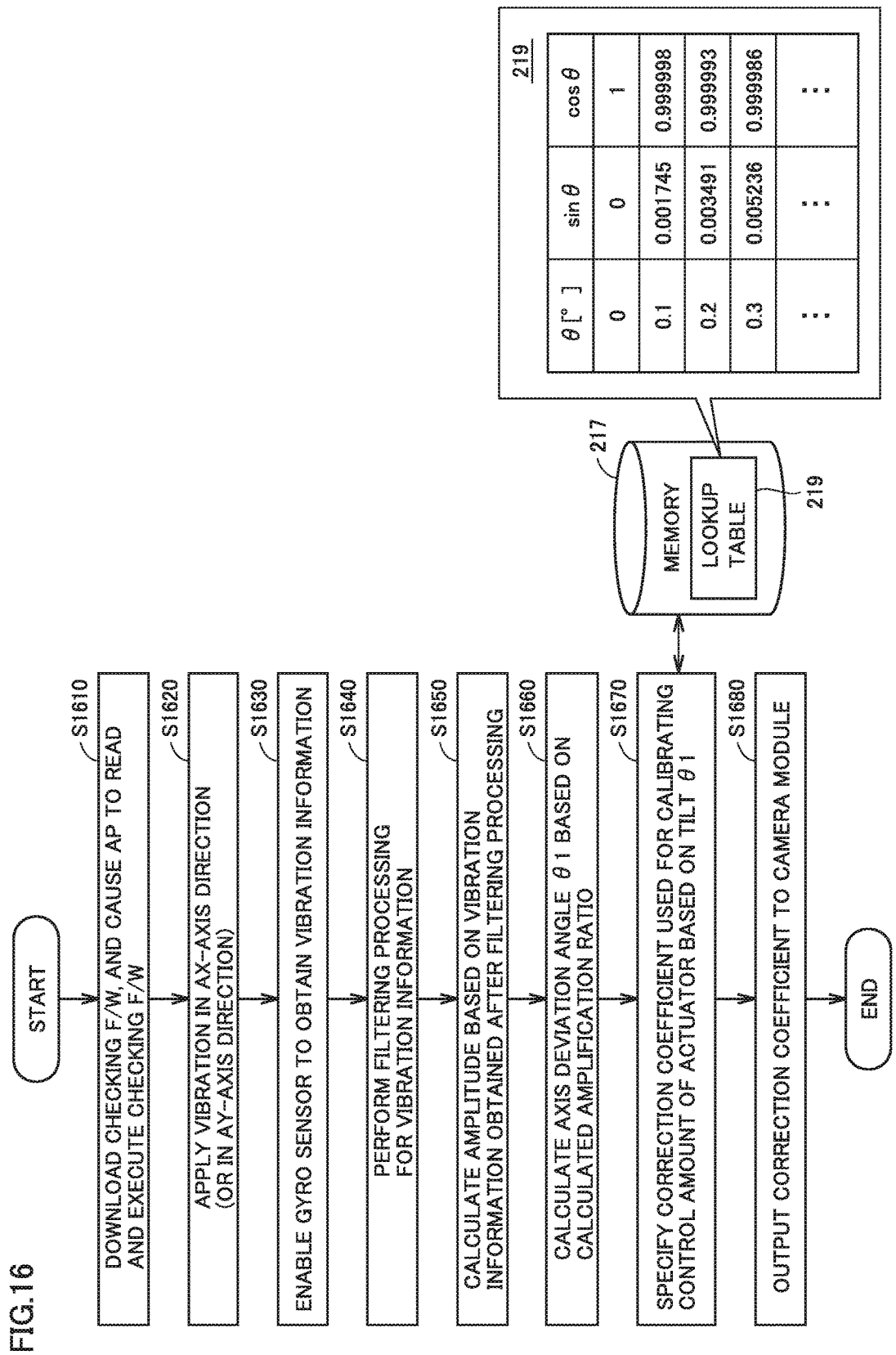
FIG. 16 is a flowchart for illustrating the control flow in which an AP calculates a correction coefficient, according to the third embodiment.

FIG. 16 is a flowchart for illustrating the control flow in which AP 215 calculates a correction coefficient, according to the third embodiment.

In step S1610, AP 215 downloads checking F/W 1420 from test host 280, and stores the downloaded checking F/W 1420 in memory 217. AP 215 reads checking F/W from memory 217, and executes this checking F/W.

In step S1620, information processing terminal 100 fixed to vibration device 1410 is vibrated in the AX-axis direction of actuator 140. In another aspect, information processing terminal 100 may be vibrated in the AY-axis direction of actuator 140.

In step S1630, AP 215 enables gyro sensor 115 so as to obtain the output (vibration information) from gyro sensor 115. In step S1640, AP 215 performs filtering processing (for example, smoothing processing) for the vibration information.

In step S1650, AP 215 calculates the amplitude based on the vibration information obtained after the filtering processing. More specifically, AP 215 calculates the amplitude of the vibration information along the X axis and the amplitude of the vibration information along the Y axis.

In step S1660, based on the ratio between the amplitude of the vibration information along the X axis and the amplitude of the vibration information along the Y axis, which are calculated in step S1650, AP 215 calculates axis deviation angle θ1.

In step S1670, AP 215 refers to lookup table 219 stored in memory 217, to specify correction coefficients sin θ1 and cos θ1 for axis deviation angle θ1. These correction coefficients are values used for calibrating the driving amount of actuator 140 that is predetermined according to the output from gyro sensor 115.

In step S1680, AP 215 outputs the specified correction coefficients to camera module 120. Camera module 120 stores the inputted correction coefficients in memory 245.

In view of the above description, by the inspection method according to inspection system 1400, the axis deviation angle between the gyro sensor and the actuator can be calculated using the vibration device. Generally, the vibration device is used for adjusting the sensitivity of the gyro sensor. Thus, this inspection method does not require new capital investment, but employs the existing facility, thereby allowing correction (calibration) of the driving amount of actuator 140 that is required when gyro sensor 115 disposed outside camera module 120 is used.

In view of the above description, according to a certain embodiment, the disclosed technical characteristics may be summarized as follows, for example.

[Configuration]

(Configuration 1)

According to a certain embodiment, a method for calibrating a driving amount of an actuator 140 configured to correct blurring of an image taken by a camera module 120 attached to an information processing terminal 100 is provided. Information processing terminal 100 includes a gyro sensor 115 for sensing a change in the posture of information processing terminal 100. This method includes: taking an image of a chart 275 by an image sensor 225 to generate the first image, chart 275 reflecting a predetermined posture of information processing terminal 100 (step S520); detecting a tilt (axis deviation angle θ1) of chart 275 in the first image (step S540); and based on the tilt of chart 275, correcting the driving amount of actuator 140 that is predetermined according to the sensing result of gyro sensor 115 (steps S550 and S560).

(Configuration 2)

In (Configuration 1), chart 275 has a shape specifying the axis directions (X, Y) of gyro sensor 115.

(Configuration 3)

In (Configuration 1), the tilt of chart 275 shows a tilt of the axis (AX, AY) of actuator 140 relative to the axis (X, Y) of gyro sensor 115.

(Configuration 4)

In (Configuration 1), camera module 120 includes an image sensor 225 formed by an imaging element, and a lens 230 for forming an image of light on image sensor 225. The above-described method further includes: after actuator 140 is caused to act on lens 230 or image sensor 225 from the state where the first image is taken, taking an image of chart 275 by image sensor 225 to generate the second image (step S1340 and step S1350); calculating a difference between the position of chart 275 (1210) in the first image and the position of chart 275 (1220) in the second image (step S1370); and, based on the difference, correcting the driving amount of actuator 140 that is predetermined according to the sensing result of gyro sensor 115 (step S1380).

(Configuration 5)

In (Configuration 1), correcting the driving amount of actuator 140 includes: referring to a lookup table 219 including a memory (217) storing a correction value and a tilt associated with each other, to specify a correction coefficient in accordance with the tilt of chart 275; and, based on the specified correction coefficient, correcting the driving amount of actuator 140 that is predetermined according to the sensing result of gyro sensor 115.

(Configuration 6)

In (Configuration 1), correcting the driving amount of actuator 140 includes: referring to a relational expression between the correction value and the tilt stored in memory (217), to specify a correction coefficient in accordance with the tilt of chart 275; and, based on the specified correction coefficient, correcting the driving amount of actuator 140 that is predetermined according to the sensing result of gyro sensor 115.

(Configuration 7)

According to another embodiment, a method for calibrating a driving amount of an actuator 140 configured to correct blurring of an image taken by a camera module 120 attached to an information processing terminal 100 is provided. Information processing terminal 100 includes a gyro sensor 115 for sensing a change in the posture of information processing terminal 100. The method includes: swinging information processing terminal 100 having camera module 120 attached thereto in the direction about the AX axis or the AY axis of actuator 140 (step S1620); during swinging of information processing terminal 100, detecting the amount of change in the output from gyro sensor 115 along (i) the X-axis direction extending approximately in the same direction as a prescribed axis and (ii) the Y-axis direction that is orthogonal to the X-axis direction (step S1630); and, based on the ratio between the amount of change in the output from the gyro sensor along the X-axis direction and the amount of change in the output from the gyro sensor along the Y-axis direction, correcting the driving amount of actuator 140 that is predetermined according to the sensing result of gyro sensor 115 (steps S670 and S1680).

Although the embodiments of the present disclosure have been described as above, it should be understood that the embodiments disclosed herein are illustrative and non-restrictive in every respect. The scope of the present disclosure is defined by the terms of the claims, and is intended to include any modifications within the meaning and scope equivalent to the terms of the claims.

What is claimed is:

1. A method comprising:
    taking an image of a mark by a camera to generate a first image, the mark reflecting a predetermined posture of a device to which the camera is attached;
    detecting a tilt of the mark in the first image; and
    correcting a driving amount of an actuator for correcting blurring of an image taken by the camera based on the tilt of the mark, the driving amount being predetermined according to a sensing result of a sensor for sensing a change in a posture of the device, wherein
    the camera includes
        an image sensor configured by an imaging element, and
        a lens for forming an image of light on the image sensor, the method further comprising:
    after causing the actuator to act on the lens or the image sensor from a state where the first image is taken, taking an image of the mark by the camera to generate a second image;
    calculating a difference between a position of the mark in the first image and a position of the mark in the second image; and
    based on the difference, correcting the driving amount of the actuator that is predetermined according to the sensing result of the sensor.

2. The method according to claim 1, wherein the sensor includes a gyro sensor.

3. The method according to claim 2, wherein the mark has a shape specifying an axis direction of the gyro sensor.

4. The method according to claim 2, wherein the tilt of the mark includes a tilt of an axis of the actuator relative to an axis of the gyro sensor.

5. A method comprising:
    taking an image of a mark by a camera to generate a first image, the mark reflecting a predetermined posture of a device to which the camera is attached;
    detecting a tilt of the mark in the first image; and
    correction a driving amount of an actuator for correcting blurring of an image taken by the camera based on the tilt of the mark, the driving amount being predetermined according to a sensing result of a sensor for sensing a change in a posture of the device, wherein
    the correcting the driving amount of the actuator includes
        referring to a lookup table including a memory storing a tilt and a correction value that are associated with each other, to specify a correction coefficient in accordance with the tilt of the mark; and
        based on the specified correction coefficient, correcting the driving amount of the actuator that is predetermined according to the sensing result of the sensor.

6. The method according to claim 5, wherein the sensor includes a gyro sensor.

7. The method according to claim 6, wherein the mark has a shape specifying an axis direction of the gyro sensor.

8. The method according to claim 6, wherein the tilt of the mark includes a tilt of an axis of the actuator relative to an axis of the gyro sensor.

9. A method comprising:
    taking an image of a mark by a camera to generate a first image, the mark reflecting a predetermined posture of a device to which the camera is attached;
    detecting a tilt of the mark in the first image; and
    correcting a driving amount of an actuator for correcting blurring of an image taken by the camera based on the tilt of the mark, the driving amount being predetermined according to a sensing result of a sensor for sensing a change in a posture of the device, wherein
    the correcting the driving amount of the actuator includes:
        referring to a relational expression between a tilt and a correction value stored in a memory, to specify a correction coefficient in accordance with the tilt of the mark; and
        based on the specified correction coefficient, correcting the driving amount of the actuator that is predetermined according to the sensing result of the sensor.

10. The method according to claim 9, wherein the sensor includes a gyro sensor.

11. The method according to claim 10, wherein the mark has a shape specifying an axis direction of the gyro sensor.

12. The method according to claim 10, wherein the tilt of the mark includes a tilt of an axis of the actuator relative to an axis of the gyro sensor.

13. A method comprising:
    swinging a device having a camera attached thereto in a direction about a prescribed axis of an actuator configured to correct blurring of an image taken by the camera;
    during swinging of the device, detecting an amount of change in an output from a gyro sensor for sensing a change in a posture of the device, the amount of change being defined along a first direction extending in a direction that is approximately identical to the prescribed axis, and along a second direction that is orthogonal to the first direction; and
    based on a ratio between the amount of change in the output from the gyro sensor along the first direction and the amount of change in the output from the gyro sensor along the second direction, correcting a driving amount of the actuator that is predetermined according to a sensing result of the gyro sensor.

* * * * *